United States Patent
Jhan (10) Patent No.: US 11,055,004 B2
(45) Date of Patent: Jul. 6, 2021

(54) DATA STORAGE DEVICE AND CONTROL METHOD FOR NON-VOLATILE MEMORY

(71) Applicant: Silicon Motion, Inc., Jhubei (TW)

(72) Inventor: Bo-Yan Jhan, New Taipei (TW)

(73) Assignee: SILICON MOTION, INC., Jhubei (TW)

(*) Notice: Subject to any disclaimer, the term of this patent is extended or adjusted under 35 U.S.C. 154(b) by 0 days.

(21) Appl. No.: 16/747,109

(22) Filed: Jan. 20, 2020

(65) Prior Publication Data

US 2020/0272332 A1 Aug. 27, 2020

Related U.S. Application Data

(60) Provisional application No. 62/810,422, filed on Feb. 26, 2019.

(30) Foreign Application Priority Data

Aug. 12, 2019 (TW) .................................. 108128515

(51) Int. Cl.
G06F 3/06 (2006.01)
G06F 12/02 (2006.01)

(52) U.S. Cl.
CPC .............. *G06F 3/064* (2013.01); *G06F 3/061* (2013.01); *G06F 3/0658* (2013.01); *G06F 3/0679* (2013.01); *G06F 12/0253* (2013.01)

(58) Field of Classification Search
None
See application file for complete search history.

(56) References Cited

U.S. PATENT DOCUMENTS

| 5,319,778 A | 6/1994 | Catino |
| 7,587,427 B2 | 9/2009 | Satou et al. |
| 8,112,574 B2 | 2/2012 | Lee et al. |

(Continued)

FOREIGN PATENT DOCUMENTS

| TW | 201413453 A | 4/2014 |
| TW | 201439772 A | 10/2014 |

(Continued)

OTHER PUBLICATIONS

Non-Final Office Action dated Nov. 30, 2020, issued in U.S. Appl. No. 16/573,409.

(Continued)

*Primary Examiner* — Kevin Verbrugge
(74) *Attorney, Agent, or Firm* — McClure, Qualey & Rodack, LLP (57) ABSTRACT

A high-performance data storage device is disclosed, including a non-volatile memory, a controller, and a temporary storage. Sub mapping tables divided from a logical-to-physical address mapping table according to logical address groups are stored in mapping blocks allocated in the non-volatile memory. The controller limits the number of mapping blocks by garbage collection, and performs garbage collection on a source mapping block in sections. During each garbage collection section, the controller downloads valid sub mapping tables from the source mapping block to the temporary storage and then programs the valid sub mapping tables from the temporary storage to a destination mapping block. The temporary storage is repeatedly used to store valid sub mapping tables downloaded in the different garbage collection sections.

20 Claims, 8 Drawing Sheets

(56) References Cited

U.S. PATENT DOCUMENTS

| | | |
|---|---|---|
| 9,268,706 B2 | 2/2016 | Kunimatsu et al. |
| 9,383,927 B2 | 7/2016 | Thomas |
| 9,460,025 B1 | 10/2016 | Wallace et al. |
| 9,529,731 B1 | 12/2016 | Wallace et al. |
| 10,635,358 B2 | 4/2020 | Hsiao et al. |
| 10,810,123 B1 | 10/2020 | Xu et al. |
| 2003/0204702 A1 | 10/2003 | Lomax, Jr. et al. |
| 2010/0077136 A1 | 3/2010 | Ware et al. |
| 2012/0166723 A1 | 6/2012 | Araki et al. |
| 2014/0032818 A1 | 1/2014 | Chang et al. |
| 2014/0082265 A1 | 3/2014 | Cheng |
| 2014/0181415 A1 | 6/2014 | Loh et al. |
| 2014/0223071 A1 | 8/2014 | Bert et al. |
| 2014/0223079 A1 | 8/2014 | Zhang et al. |
| 2015/0339058 A1 | 11/2015 | Yoshii et al. |
| 2016/0004642 A1 | 1/2016 | Sugimoto et al. |
| 2016/0124649 A1 | 5/2016 | Liu et al. |
| 2016/0291878 A1 | 10/2016 | Kang |
| 2017/0083451 A1 | 3/2017 | Tan |
| 2017/0308396 A1 | 10/2017 | Hsieh |
| 2018/0196747 A1 | 7/2018 | Tang |
| 2019/0057038 A1 | 2/2019 | Haswell |
| 2019/0227931 A1 | 7/2019 | Jung |
| 2019/0310944 A1 | 10/2019 | Rudoff et al. |
| 2020/0264984 A1 | 8/2020 | Adams et al. |

FOREIGN PATENT DOCUMENTS

| | | | |
|---|---|---|---|
| TW | | I521343 B | 2/2016 |
| TW | | 201712549 A | 4/2017 |
| TW | | 201810017 A | 3/2018 |
| TW | | 201826126 A | 7/2018 |
| TW | | I660346 B | 5/2019 |

OTHER PUBLICATIONS

"What is Bit Masking?;" Stack Overflow; Nov. 2016; p. 1-4, http://web.archive.org/web/20161126111540/https://stackoverflow.com/questions/10493411/what-is-bit-masking.

Non-Final Office Action dated Nov. 9, 2020, issued in U.S. Appl. No. 16/585,583.

Non-Final Office Action dated Mar. 26, 2021, issued in U.S. Appl. No. 16/728,294 (copy not provided).

Final Office Action dated Apr. 5, 2021, issued in U.S. Appl. No. 16/585,583 (copy not provided).

DATA STORAGE DEVICE AND CONTROL METHOD FOR NON-VOLATILE MEMORY

CROSS REFERENCE TO RELATED APPLICATIONS

This Application claims the benefit of U.S. Provisional Application No. 62/810,422, filed on Feb. 26, 2019, the entirety of which is incorporated by reference herein.

This Application also claims priority of Taiwan Patent Application No. 108128515, filed on Aug. 12, 2019, the entirety of which is incorporated by reference herein.

BACKGROUND OF THE INVENTION

Field of the Invention

The present invention is related to data storage devices, and in particular it is related to the management of mapping information of a data storage device.

Description of the Related Art

There are various forms of non-volatile memory (NVM) for long-term data storage, such as flash memory, magnetoresistive random access memory (RAM), ferroelectric RAM, resistive RAM, spin transfer torque-RAM (STT-RAM), and so on. These non-volatile memories may be used as the storage medium in a data storage device.

Non-volatile memory typically has particular storage characteristics. The technical field needs to develop corresponding control technology.

BRIEF SUMMARY OF THE INVENTION

A data storage device in accordance with an exemplary embodiment of the present invention includes a non-volatile memory, a controller, and a temporary storage. The non-volatile memory stores a plurality of sub mapping tables. The sub mapping tables are divided from a logical-to-physical address mapping table according to logical address groups. The controller sets an upper limit, x, for the total number of mapping blocks allocated in the non-volatile memory to store the plurality of sub mapping tables. The controller performs garbage collection on a source mapping block in sections. The source mapping block is selected from the mapping blocks. During each garbage collection section, the controller downloads valid sub mapping tables from the source mapping block to the temporary storage and then programs the valid sub mapping tables from the temporary storage to a destination mapping block which is planned as one of the mapping blocks. The temporary storage is repeatedly used to store valid sub mapping tables downloaded in the different garbage collection sections. The present invention optimizes the management of mapping data of the non-volatile memory. Hardware cost of the temporary memory is reduced. The performance of the data storage device is not dragged down by the management of mapping data.

In an exemplary embodiment, the controller selects the source mapping block from the mapping blocks when the total number of mapping blocks reaches a critical amount, a. The controller sets a total section number, y, based on the upper limit, x, and the critical amount, a, to divide the garbage collection of the source mapping block into y sections.

In an exemplary embodiment, the controller sets the total section number, y, to (x−a)+1.

In an exemplary embodiment, based on a valid count, VC, and the total section number, y, the controller calculates an amount, M, to determine the number of valid sub mapping tables to be collected per garbage collection section. The valid count, VC, is the total number of valid sub mapping tables of the source mapping block. The amount, M, is VC/y.

In an exemplary embodiment, there is an upper limit, z, for the number of valid sub mapping tables collected per garbage collection section. When the amount, M, is not greater than the upper limit, z, the controller collects M valid sub mapping tables per garbage collection section. When the amount, M, is greater than the upper limit, z, the controller collects z valid sub mapping tables per garbage collection section.

In an exemplary embodiment, the upper limit, z, is (Total_G/x)/y, where Total_G is the total number of logical address groups.

In an exemplary embodiment, after programming a first batch of valid sub mapping tables corresponding to a first garbage collection section to the destination mapping block and prior to downloading a second batch of valid sub mapping tables corresponding to a second garbage collection section to the temporary storage, the controller responds to a request from a host.

For a target sub mapping table of garbage collection, the controller may check whether a newer version is stored in the temporary storage to avoid programming old sub mapping tables to the destination block.

In an exemplary embodiment, the controller establishes a mapping block list to point to the mapping blocks. The mapping block list further shows the total number of mapping blocks.

The aforementioned controller may be implemented in other architectures. In an exemplary embodiment, a non-volatile memory control method based on the foregoing concept, including the following steps: storing a plurality of sub mapping tables in the non-volatile memory, wherein the sub mapping tables are divided from a logical-to-physical address mapping table according to logical address groups; setting an upper limit, x, for the total number of mapping blocks allocated in the non-volatile memory to store the plurality of sub mapping tables; performing garbage collection on a source mapping block in sections, wherein the source mapping block is selected from the mapping blocks; and, during each garbage collection section, downloading valid sub mapping tables from the source mapping block to the temporary storage and then programming the valid sub mapping tables from the temporary storage to a destination mapping block which is planned as one of the mapping blocks. The temporary storage is repeatedly used to store valid sub mapping tables downloaded in the different garbage collection sections.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (RAM_, a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built data storage devices using flash memories as the storage medium. For example, a server may operate an array of SSDs to form a data center. The server may be regarded as a host that operates the SSDs to access the flash memories within the SSDs.

Figure 1:
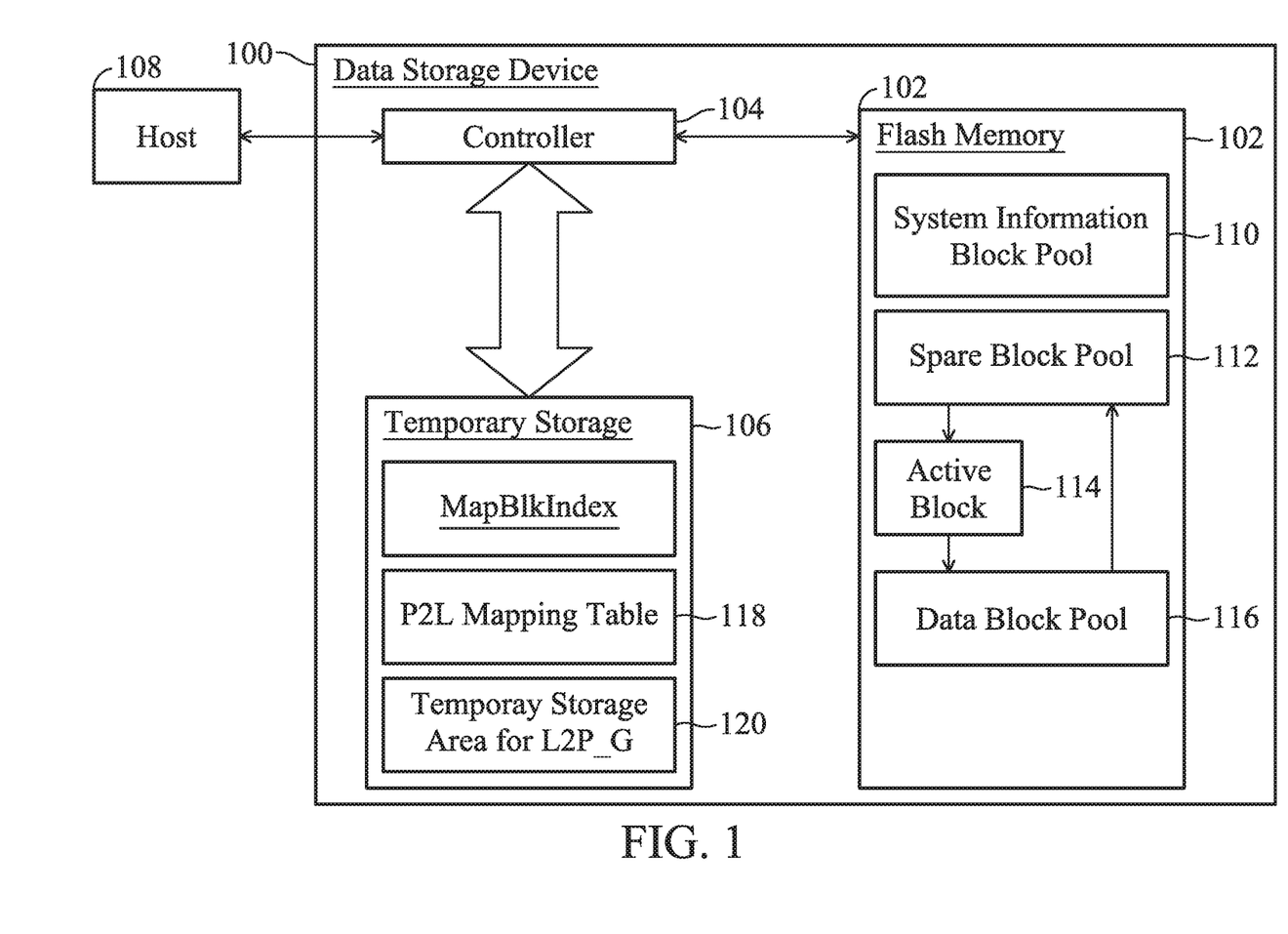
FIG. 1 is a block diagram illustrating a data storage device 100 in accordance with an exemplary embodiment of the present invention.
Figure 2:
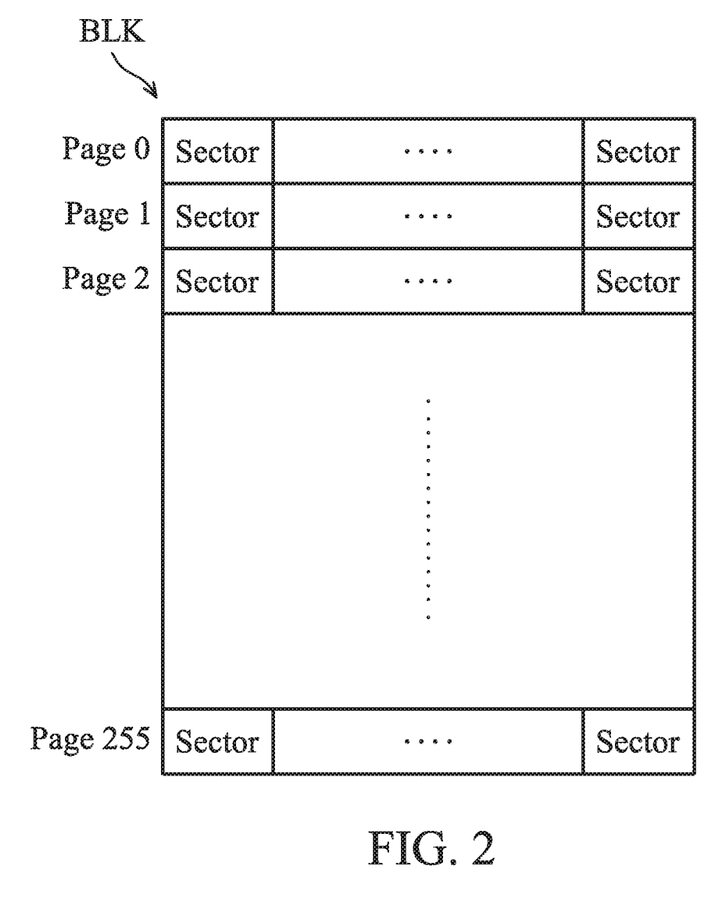
FIG. 2 illustrates the architecture of one block BLK.

FIG. 1 is a block diagram illustrating a data storage device 100 in accordance with an exemplary embodiment of the present invention, including a flash memory 102, a controller 104 (e.g., a memory controller), and a temporary storage 106. The host 108 operates the flash memory 102 through the controller 104. The physical space of the flash memory 102 is divided into a plurality of blocks. FIG. 2 illustrates the architecture of one block BLK, which includes a plurality of pages (e.g., page 0 to page 255). Each page includes a plurality of sectors (e.g., 32 sectors per 16K page when each sector is 512 B). In a 4 KB management mode, each data unit managed together is 4 KB, including 8 sectors of data. For simplicity, the following examples are based on a 4 KB data management mode but not limited thereto.

The physical space of the flash memory 102 is dynamically allocated for use. At the host 108 end, data is identified by a logical address (such as a logical bock address LBA or a global host page GHP). A logical-to-physical address mapping table (L2P) is required to map each logical address (e.g., an LBA or GHP) to the corresponding physical address (which indicates a block number, a page number and a sector number).

In an exemplary embodiment, the controller 104 programs a block BLK from low to high page number (e.g., from page 0 to page 255). In an exemplary embodiment, the data storage device 100 adopts multi-channel technology, which regards several blocks accessed through the different channels as one super block, and treats pages among the different blocks as a super page. Storage space management is based on the super block/page concept to raise the data throughput of the data storage device 100.

Flash memory has its own particular storage characteristics. Instead of overwriting a space storing old data, a new version of data is programmed to the spare space. The old data is marked as invalid. The sporadic valid data left in a block may be moved to a spare block by garbage collection. When only invalid data is contained in a block, the block can be released and an erase procedure can be performed on the block for the reuse of the block.

Lots of flash memory operations need to refer to, or update the mapping information (e.g., the mapped physical addresses) recorded in the L2P mapping table. Reading data from the flash memory 102 may refer to the mapping information recorded in the L2P mapping table. Programming data to the flash memory 102 may change the mapping information in the L2P mapping table. In addition to responding to the read/write commands from the host, other operations, such as garbage collection, space trimming or block data transfer, etc., may be performed on the flash memory 102 actively or passively. These operations may also refer to or change the mapping information in the L2P mapping table.

However, the size of the L2P mapping table increases with the size of the flash memory 102. The management of the large-sized L2P mapping table is important. In an exemplary embodiment, each 4 KB data unit corresponds to a physical address that is in a length of 4B. When the data storage device 100 provides a 1 TB storage capacity, the L2P mapping table is 1 GB in size. The temporary storage 106 has to be at least 1 GB in size.

Figure 3:
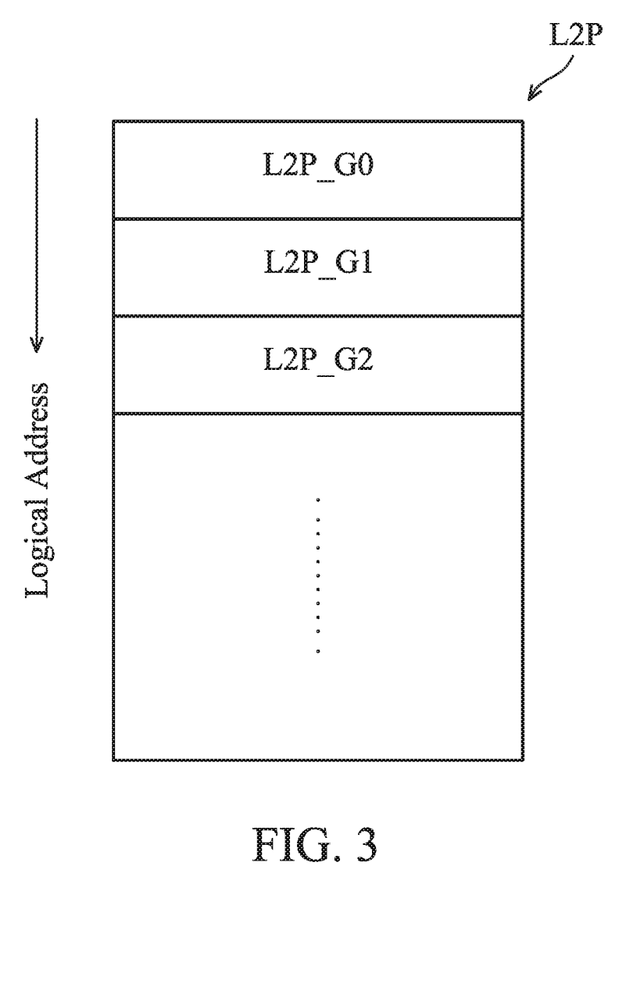
FIG. 3 illustrates the sub mapping tables L2P_G.

To reduce the storage size for the lower cost, the logical addresses may be divided into a plurality of logical address groups. In an exemplary embodiment, the logical addresses are divided into 1024 groups, and, accordingly, the L2P mapping table is divided into 1024 sub mapping tables L2P_G. Only the sub mapping table L2P_G being called is downloaded to the DRAM for reference or update. FIG. 3 illustrates the sub mapping tables L2P_G. In an exemplary embodiment, the whole logical-to-physical address mapping table L2P is divided according to a fixed logical address length. In an exemplary embodiment, the whole logical-to-physical address mapping table L2P is divided into 1024 sub mapping tables L2P_G. The first sub mapping table L2P_G0 includes mapping information of LBA0 to LBA1023, the second sub mapping table L2P_G1 includes mapping information of LBA1024 to LBA2047, and so on. The temporary storage area 120 provided within the temporary storage 106, therefore, stores only a part of the whole logical-to-physical address mapping table L2P. For example, the temporary storage area 120 may store only 64 sub mapping tables L2P_G rather than the whole logical-to-physical address mapping table L2P. Only a small space of temporary storage 106 is occupied by the temporary storage area 120. The data storage device 100 only needs to configure a low-cost small-capacity temporary storage 106. Such hardware architecture is named a partial DRAM architecture.

Figure 4:
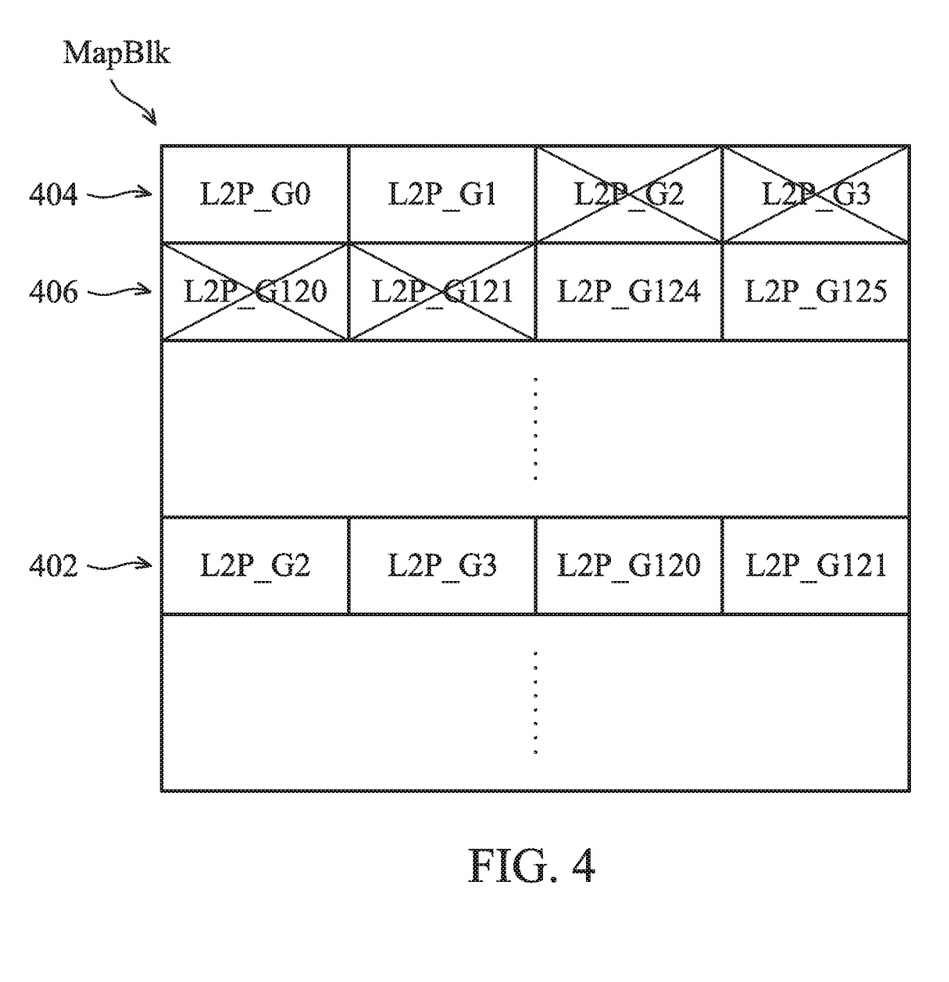
FIG. 4 illustrates how the sub mapping tables L2P_G are managed on the flash memory 102.

FIG 4 illustrates how the sub mapping tables L2P_G are managed on the flash memory 102. The blocks allocated to store sub mapping tables L2P_G are named mapping blocks MapBlk and are classified into a system information block pool 110. The old version of the updated sub mapping tables L2P_G is invalidated (crossed out). Referring to the mapping block MapBlk shown in FIG 4, the sub mapping tables L2P_G2, L2P_G3, L2P_G120, and L2P_G121 are updated and the new version of the sub mapping tables L2P_G2, L2P_G3, L2P_G120, and L2P_G121 are programmed into page 402. The old version of the sub mapping tables L2P_G2 and L2P_G3 (in page 404) and the old version of the sub mapping tables L2P_G120 and L2P_G121 (in page 406) are invalidated. Only two valid sub mapping tables L2P_G0 and L2P_G1 remain in page 404, and only two valid sub mapping tables L2P_G124 and L2P_G125 remain in page 406. As data programming and updating is performed on the flash memory 102, there are fewer and fewer valid sub mapping tables L2P_G that remain in one mapping block MapBlask. How to optimize the mapping blocks MapBlk is an important technical issue.

In order to optimize the mapping blocks MapBlk, the total number of mapping blocks MapBlk should have an upper limit, x, to prevent the unlimited growth of the mapping blocks MapBlk. In the present invention, garbage collection is performed on the mapping blocks MapBlk. The mapping block with the smallest number of valid sub mapping tables L2P_G is selected as a source mapping block to be released. The valid sub mapping tables L2P_G in the source mapping block are removed in sections. The mapping information collected during each garbage collection section is limited within a reasonable amount. The use of hardware resources is reduced. Between the garbage collection sections, other procedures, such as read/write operations as requested by the host 108, may be performed. The system performance of the data storage device 100, therefore, is enhanced.

The flash memory 102 has a system information block pool 110. The system information block pool 110 may include more than one mapping blocks MapBlk provided from the spare block pool 112. The controller 104 may further select an active block 114 from the spare block pool 112, for the programming of write data issued by the host 108. After being closed, e.g., according to the programming of End Of Block (EOB) information, the active block 114 is pushed into a data block pool 116 as a data block. In another exemplary embodiment, the active block 114 serves as a destination block for the internal data transfer. In another exemplary embodiment, the mapping blocks MapBlk are provided by an exclusive spare block pool different from the spare block pool 112.

As the active block 114 is programmed, the controller 104 manages a physical-to-logical address (P2L) mapping table 118 on the temporary storage 106 to record the logical addresses mapped to the physical space of the active block 114. According to the physical-to-logical address (P2L) mapping table 118, the controller 104 determines which sub mapping tables L2P_G (regarded as target sub mapping tables) must be updated. The target sub mapping tables are read from the mapping blocks MapBlk and downloaded to the temporary storage 106. After being updated on the temporary storage 106, the sub mapping tables L2P_G are uploaded to the flash memory 102 and thereby the latest version of sub mapping tables L2P_G are kept in the mapping blocks MapBlk. The updated sub mapping tables L2P_G are programmed to an active mapping block MapBlk, different from the active blocks 114 for user data.

Furthermore, in response to a read request from the host 108, or in response to internal requests such as garbage collection, space trimming or block data transfer, target sub mapping tables L2P_G may be also read from the mapping blocks MapBlk and downloaded to the temporary storage 106. It is convenient to refer to the temporary storage 106 for the mapping information recorded in the target sub mapping table L2P_G.

In order to efficiently manage the storage space of the mapping block MapBlk, the controller 104 may establish mapping block lists MapBlkIndex in the temporary storage 106. Each mapping block list MapBlkIndex corresponds to one mapping block MapBlk, and shows whether the sub mapping tables L2P_G stored in the corresponding mapping block MapBlk are valid or invalid. The valid sub mapping tables L2P_G are marked by "1" and the invalid sub mapping tables L2P_G are marked by "0". Note that the number of mapping blocks MapBlk does not exceed the upper limit x. In an example wherein x is 8, the controller 104 may establish mapping block lists MapBlkIndex #0~#7 to correspond to the mapping blocks MapBlk #0~#7, respectively.

The controller 104 may check the total amount of the mapping block MapBlk in a foreground or background mode. Compared to the foreground mode, the controller 104 does not have to respond to the requests from the host 108. When the total number of mapping blocks MapBlk reaches a critical amount, a (e.g., a=7), the controller 104 starts garbage collection of the mapping blocks MapBlk. One of the mapping blocks MapBlk is selected as a source mapping block, and one spare block or one active mapping block is used as a destination mapping block. For example, the number 0 mapping block MapBlk #0 is selected as the source mapping block and the destination mapping block is the number 7 mapping block MapBlk #7. In an exemplary embodiment, the controller 104 preferably selects the mapping block MapBlk having, the smallest number of valid sub mapping tables (the smallest valid count VC) as the source mapping block.

By executing the garbage collection, the controller 104 downloads the valid sub mapping tables L2P_G that remain in the source mapping block to the temporary storage area 120 and then programs the downloaded valid sub mapping tables L2P_G to the destination mapping block. The garbage collection is preferably divided into sections, that is, the valid sub mapping tables L2P_G are collected in sections. For example, eight sub mapping tables L2P_G are collected per garbage collection section. Read/write requests from the host 108 may be inserted between the different garbage collection sections. When all the valid sub mapping tables L2P_G of the source mapping block have been collected to the destination mapping block, the source mapping block can be released as a spare block. The temporary storage area 120 is reused in the different garbage collection sections for the temporary storage of the downloaded sub mapping tables L2P_G.

The total section number, y, may depend from the upper limit, x, and the critical amount, a, of the mapping blocks MapBlk. In an exemplary embodiment, the total section number, y, is (x−a)+1. During each garbage collection section, the number of sub mapping tables L2P_G collected to the destination mapping block is M, which may depend from a valid count VC of the valid sub mapping tables L2P_G of the source mapping block and the total section number, y, that is, M=VC/y. In addition, the amount M may have an upper limit, z. The upper limit, z, may be (Total_G/x)/y, where Total_G is the total number of logical address groups G. When the amount, M, is not greater than the upper limit, z, the controller 104 sequentially (from the beginning to the end of the source mapping block) collects M valid sub mapping tables L2P_G per garbage collection section. When the amount, M, is greater than the upper limit, z, the controller 104 increases the total section number, y, and sequentially collects z valid sub mapping tables L2P_G per garbage collection section. Because of the upper limit, z, the computing loading of each garbage collection section is reasonable and the temporary storage area 120 can be small. A small-capacity temporary storage 106 is enough, so that the cost of the temporary storage 106 is reduced.

Figure 5A:
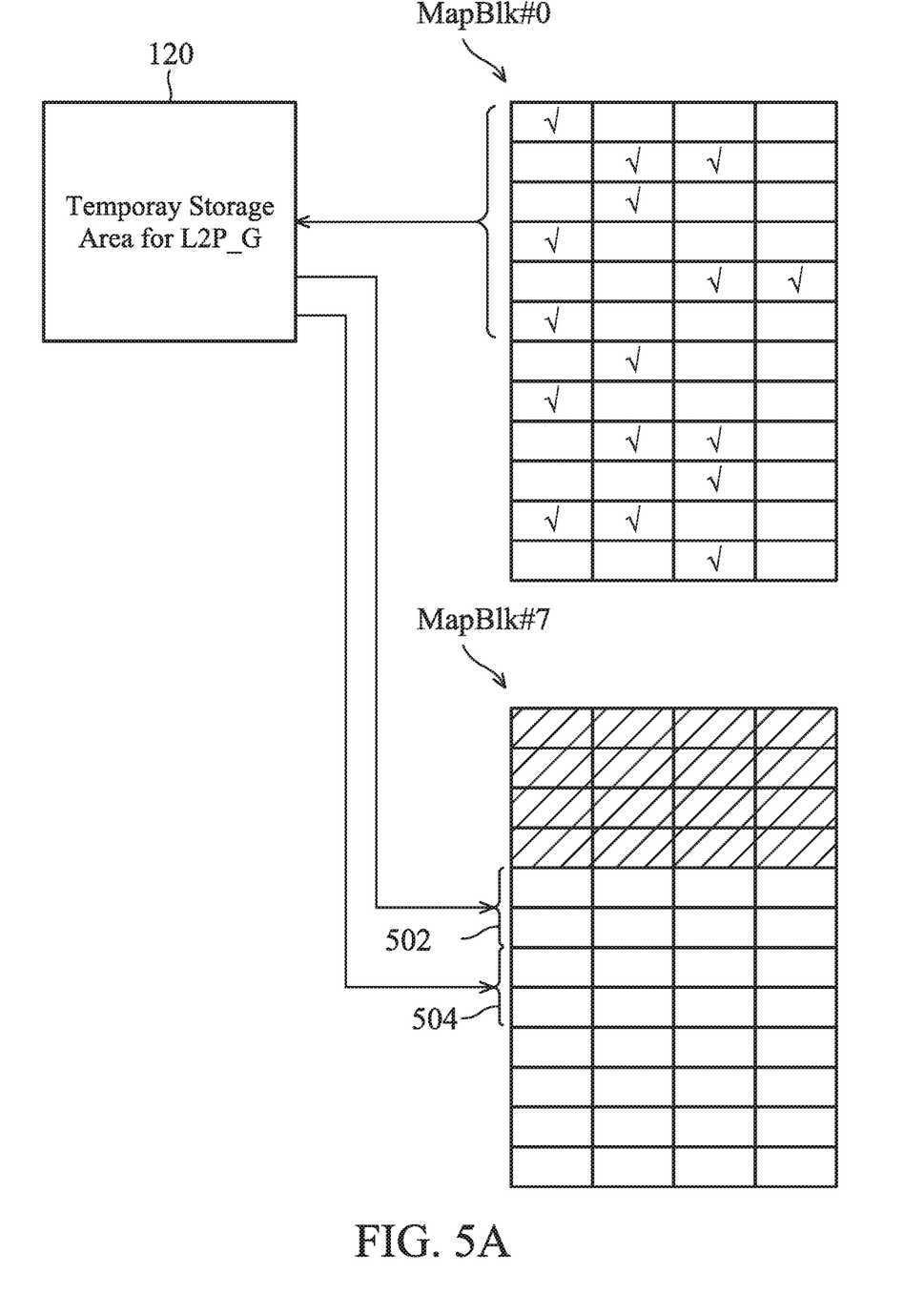
FIGS. 5A and 5B illustrate how the execution of garbage collection is divided into sections.
Figure 5B:
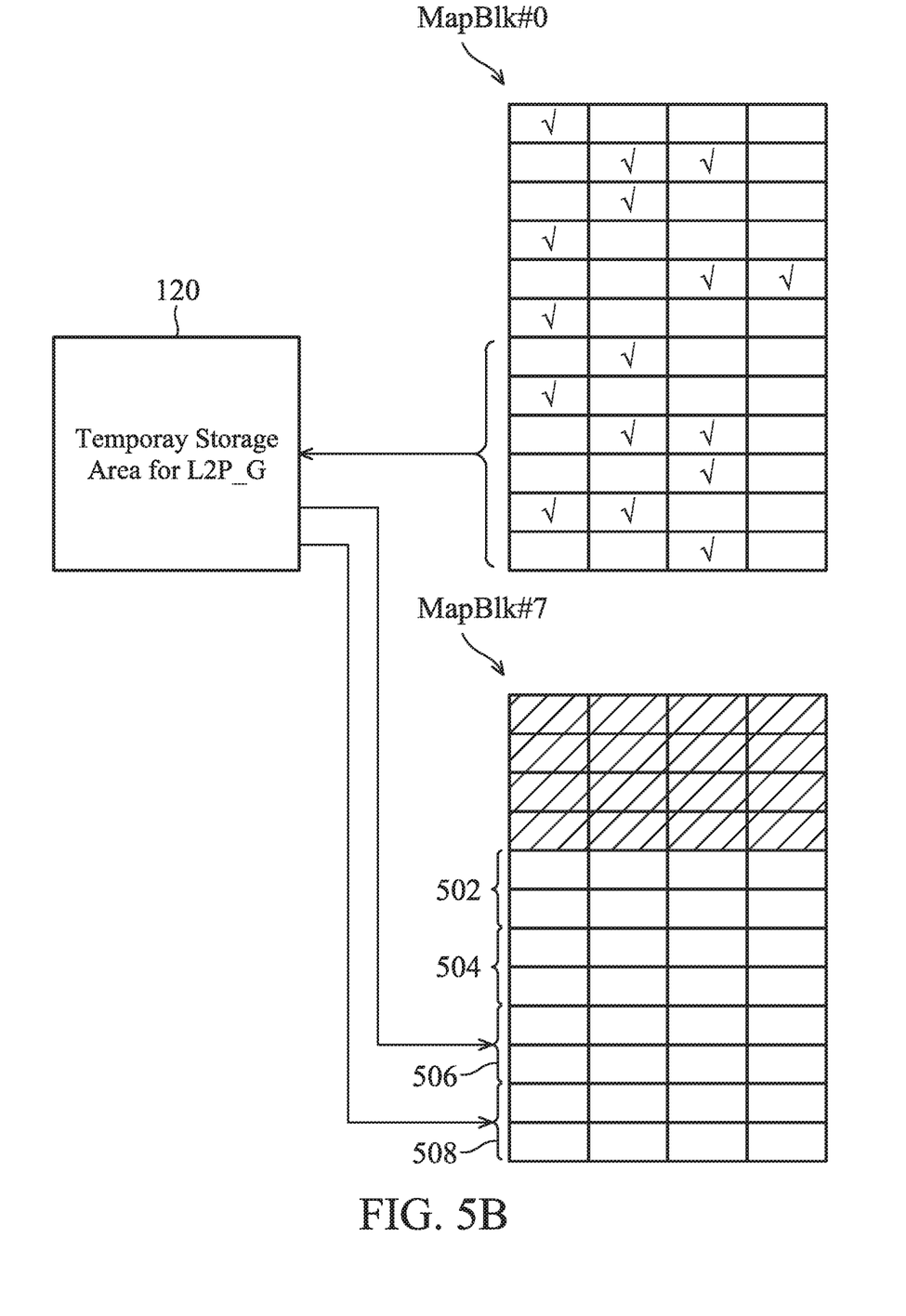

FIGS. 5A and 5B illustrate how the execution of garbage collection is divided into sections. The upper limit, x, of the total number of mapping blocks MapBlk is 5. The critical amount, a, of the mapping blocks MapBlk is 4. The mapping block MapBlk #0 is the source mapping block. A valid count VC (which is the total number of valid sub mapping tables L2P_G within the source mapping block MapBlk #0) is 16. The total section number, y, is 2. Eight sub mapping tables L2P_G are collected from the source mapping block to the destination mapping block per garbage collection section, that is, M is 8, which is lower than 12, the upper limit, z. The mapping block MapBlk #7 is the destination mapping block.

In the first garbage collection section (referring to FIG. 5A), the controller 104 downloads the first eight valid sub mapping tables L2P_G (marked by 'V') of the source mapping block MapBlk #0 to the temporary storage area 120 and then programs them back to the flash memory 102 to the storage space 502 of the destination mapping block MapBlk #7. After programming the first eight valid sub mapping tables L2P_G to the storage space 502, the controller 104 is allowed to respond to the requests from the host 108. For example, during the spare time interval, the controller 104 may answer a write request issued by the host 108. According to the write request, the controller 104 downloads the corresponding sub mapping tables L2P_G to the temporary storage area 120 and updates the downloaded sub mapping tables L2P_G on the temporary storage area 120. In an exemplary embodiment, the controller 104 programs the updated sub mapping tables L2P_G to the destination mapping block MapBlk #7 (to space 504). The write request is answered in time.

In the second garbage collection section (referring to FIG. 5B), the controller 104 downloads the following eight valid sub mapping tables L2P_G (marked by 'V') of the source mapping block MapBlk #0 to the temporary storage area 120 and then programs them back to the flash memory 102 to the storage space 506 of the destination mapping block MapBlk #7. After programming the eight valid sub mapping tables L2P_G to the storage space 506, the controller 104 is allowed to respond to the requests from the host 108. For example, during the spare time interval, the controller 104 may answer a write request issued by the host 108. According to the write request, the controller 104 downloads the corresponding sub mapping tables L2P_G to the temporary storage area 120 and updates the downloaded sub mapping tables L2P_G on the temporary storage area 120. In an exemplary embodiment, the controller 104 programs the updated sub mapping tables L2P_G to the destination mapping block MapBlk #7 (to space 508). The write request is answered in time.

Referring to FIG. 5A, after (or prior to) the controller 204 downloads the final eight valid sub mapping tables L2P_G from the source mapping block MapBlk #0 to the temporary storage area 120, the controller 104 performs version checking. An update may occur due to the write commands inserted between the garbage collection sections. When a target sub mapping table, e.g., L2P_G #100, which should collected from the source mapping block MapBlk #0 to the destination mapping block MapBlk #7 has been amended, the controller 104 does not program the old sub mapping table L2P_G #100 (collected from the source mapping block MapBlk #0) to the space 506 of the destination mapping block MapBlk #7. In an exemplary embodiment, the controller 104 records the table number, 100, of the sub mapping table L2P_G100 when programming the sub mapping table L2P_G100 to the storage space 504 in response to the corresponding write request inserted between the garbage collection sections. The controller 104 then compares the recorded block number, 100, with the block numbers of the final eight valid sub mapping tables of the source mapping block MapBlk #0, to determine whether or not to continue the garbage collection of the marked sub mapping table (e.g., L2P_G #100). Accordingly, the sub mapping table L2P_G #100 obtained from the source mapping block MapBlk #0 for garbage collection is determined invalid and is not downloaded to the temporary storage area 120.

Figure 6:
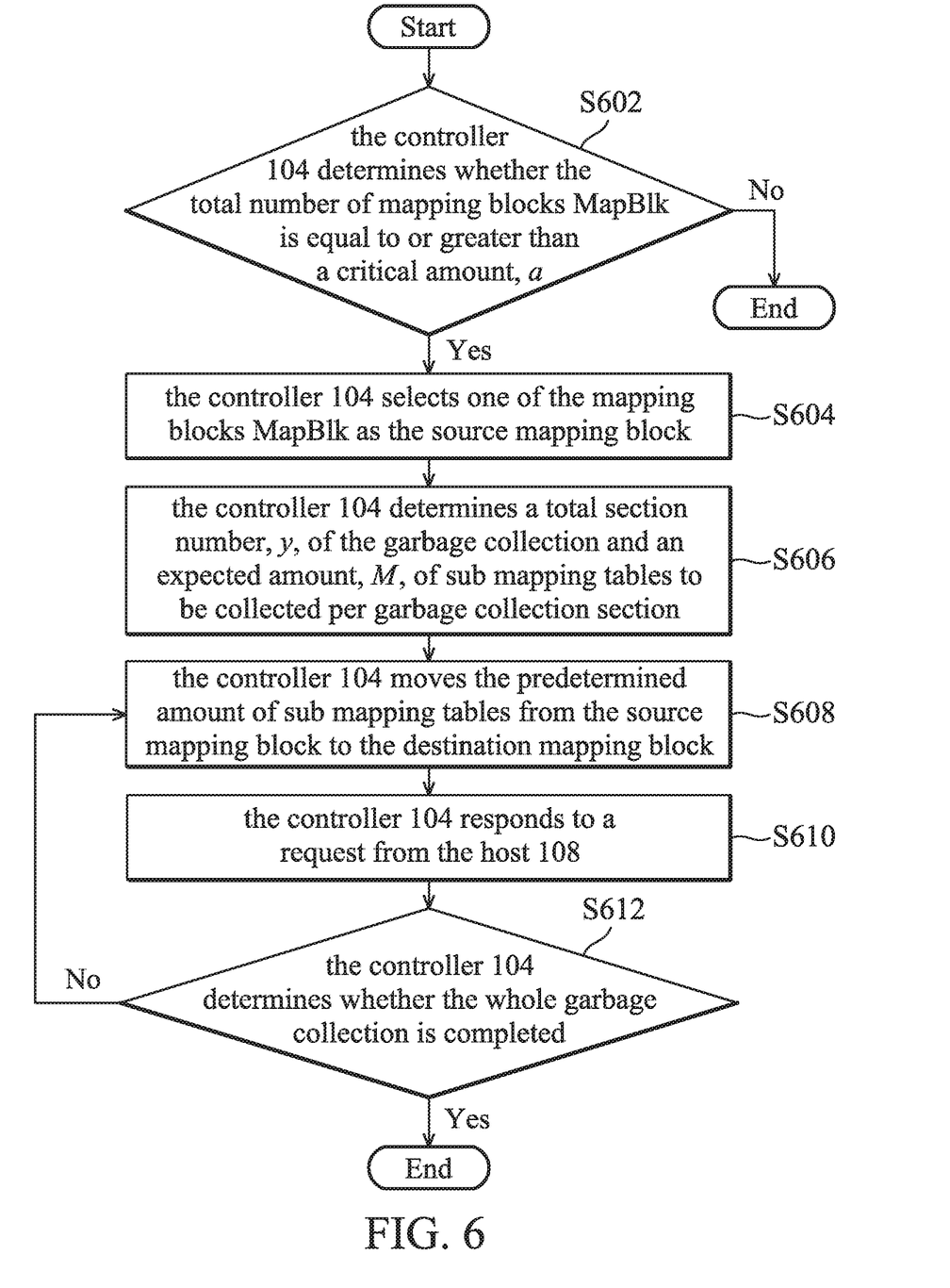
FIG. 6 is a flowchart illustrating garbage collection of mapping blocks MapBlk in accordance with an exemplary embodiment of the present invention.

FIG. 6 is a flowchart illustrating garbage collection of mapping blocks MapBlk in accordance with an exemplary embodiment of the present invention. The garbage collection of mapping blocks MapBlk may be used in the data storage device 100, and is preferably performed in a background mode. In the background mode, the controller 104 does not have to answer the host 108 and is available for other tasks. However, in some exemplary embodiments, the garbage collection of mapping blocks may be performed in a foreground mode.

In step S602, the controller 104 determines whether the total number of mapping blocks MapBlk is equal to or greater than a critical amount, a. If not, the procedure ends. If yes, step S604 is performed. For example, all of the mapping blocks MapBlk #0~#7 store sub mapping tables L2P_G. The mapping block MapBlk #7 is the active mapping block for the programming of sub mapping tables L2P_G. The total number of mapping blocks MapBlk #0~MapBlk #6 is equal to 7, the same as the critical amount a.

In step S604, the controller 104 selects one of the mapping blocks MapBlk as the source mapping block. For example, the controller 104 selects the mapping block MapBlk #0 as the source mapping block. The mapping block MapBlk #0 has the smallest valid count VC (the smallest amount of valid sub mapping tables L2P_G) in comparison with the other mapping blocks MapBlk #1~MapBlk #6. In this example, the valid count VC of the mapping block MapBlk #0 is 16.

In step S606, the controller 104 determines a total section number, y, and an amount, M, (e.g., an expected amount of sub mapping tables to be collected per garbage collection section) to divide the garbage collection of the source mapping block MapBlk #0 into sections. During each garbage collection section, the sub mapping table amount collected per garbage collection section is preferably M, or is the upper limit, z. For example, the sub mapping table amount collected per garbage collection section may be 8. It means that 8 valid sub mapping tables L2P_G should be collected from the source mapping block to the destination mapping block during each garbage collection section. The controller 104 may further determine the total section number, y, to divide the garbage collection into sections. For example, the total section number, y, may be 2.

In step S608, the controller 104 moves the predetermined amount of sub mapping tables from the source mapping block to the destination mapping block. For example, the mapping block MapBlk #7 is used as the destination mapping block of garbage collection. During the first section of garbage collection, the controller 104 downloads the first eight valid sub mapping tables L2P_G from the source mapping block MapBlk #0 to the temporary storage area 120, and then programs the downloaded eight valid sub mapping tables L2P_G to the destination mapping block MapBlk #7. The controller 104 may decrement the number of remaining sections by one.

In step S610, the controller 104 responds to a request (e.g., a write request or a read request) from the host 108. Because the whole procedure of garbage collection is divided into sections, the controller 104 may respond to host 108 requests between the different garbage collection sections. The system performance of the data storage device 100 is improved.

In step S612, the controller 104 determines whether the whole garbage collection is completed. If yes, the garbage collection of the source mapping block MapBlk finishes. If not, step S608 is repeated. When the step S608 is performed only once, the number of remaining, sections is not 0. The whole garbage collection has not been finished. Step S608 is performed again. During the second section of garbage collection, the controller 104 downloads the following 8 valid sub mapping tables L2P_G from the source mapping block MapBlk #0 to the temporary storage area 120, and then programs the downloaded 8 valid sub mapping tables L2P_G to the destination mapping block MapBlk #7. After the repeated step S608, the number of remaining sections is 0, which means that the whole garbage collection is completed.

By dividing the garbage collection of mapping blocks MapBlk into sections and properly setting the table amount collected per garbage collection section, the temporary storage 106 equipped on the data storage device 100 can be a low-cost small-capacity memory. The garbage collection of mapping blocks MapBlk can be successfully completed by the small-sized temporary storage 106.

Figure 7:
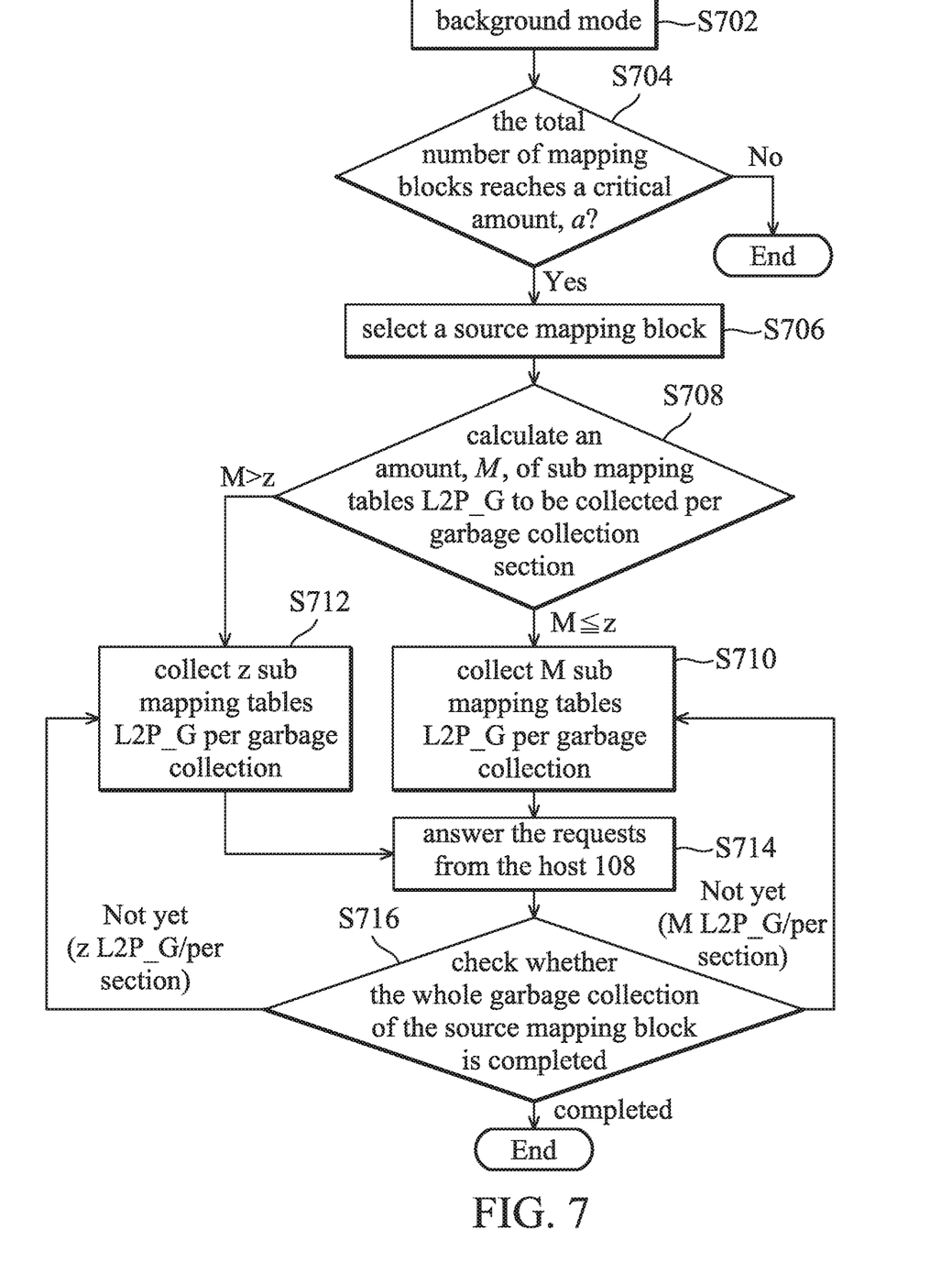
FIG. 7 is a flowchart illustrating the garbage collection of mapping blocks MapBlk in accordance with another exemplary embodiment of the present invention.

FIG. 7 is a flowchart illustrating the garbage collection of mapping blocks MapBlk in accordance with another exemplary embodiment of the present invention.

In step S702, the data storage device 100 enters a background mode. In the background mode, the controller 104 does not have to answer the host 108. The controller 104 is available to optimize the space utilization of the flash memory 102.

In step S704, the controller 104 checks the mapping block lists MapBlkIndex (or other records) to determine whether the total number of mapping blocks reaches a critical amount, a. If not, there is no need to spend resources on garbage collection of mapping blocks MapBlk. When the total number of mapping blocks reaches the critical amount a, garbage collection of mapping blocks MapBlk starts and step S706 is performed. A source mapping block is selected from the mapping blocks MapBlk indicated by the mapping block lists MapBlkIndex. For example, information about valid counts VC (the number of valid sub mapping tables L2P_G remaining in each mapping block MapBlk) of the mapping tables MapBlk can be obtained from the mapping block lists MapBlkIndex. The mapping block with the lowest valid count VC may be selected as the source mapping block.

In step S708, the controller 104 calculates an amount, M, of sub mapping tables L2P_G to be collected per garbage collection section. The calculated amount, M(=VC/y), is compared with an upper limit z (which is (Total_G/x)/y).

When the calculated amount, M, is not greater than the upper limit z, step S710 is performed. According to step S710, the number of sub mapping tables L2P_G collected during each garbage collection is M. When the calculated amount, M, is greater than the upper limit, z, step S712 is performed. In step S712, the number of sub mapping tables L2P_G collected during each garbage collection is z.

After each garbage collection section (performed in step S710 or S712), the controller 104 may perform step S714 to respond to requests from the host 108.

In step S716, the controller 104 checks whether the whole garbage collection of the source mapping block is completed. If not, step S710/S712 is performed again for the next garbage collection section.

In the present invention, requests from the host 108 are answered (in step S714) between the garbage collection sections. The data storage device 100 performs extremely well.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory, storing a plurality of sub mapping tables; and
a controller and a temporary storage,
wherein:
the sub mapping tables are divided from a logical-to-physical address mapping table according to logical address groups;
the controller sets an upper limit, x, for a total number of mapping blocks allocated in the non-volatile memory to store the plurality of sub mapping tables;
the controller performs garbage collection on a source mapping block in sections wherein the source mapping block is selected from the mapping blocks;
during each garbage collection section, the controller downloads valid sub mapping tables from the source mapping block to the temporary storage and then programs the valid sub mapping tables from the temporary storage to a destination mapping block which is planned as one of the mapping blocks; and
the temporary storage is repeatedly used to store valid sub mapping tables downloaded in the different garbage collection sections.

2. The data storage device as claimed in claim 1, wherein:
the controller selects the source mapping block from the mapping blocks when the total number of mapping blocks reaches a critical amount, a; and
the controller sets a total section number, y, based on the upper limit, x, and the critical amount, a, to divide the garbage collection of the source mapping block into y sections.

3. The data storage device as claimed in claim 2, wherein:
the controller sets the total section number, y, to (x−a)+1.

4. The data storage device as claimed in claim 2, wherein:
based on a valid count, VC, and the total section number, y, the controller calculates an amount, M, to determine the number of valid sub mapping tables to be collected per garbage collection section;

the valid count, VC, is a total number of valid sub mapping tables of the source mapping block; and the amount, M, is VC/y.

5. The data storage device as claimed in claim 4, wherein:

when the amount, M, is not greater than an upper limit, z, the controller collects M valid sub mapping tables per garbage collection section; and when the amount, M, is greater than the upper limit, z, the controller collects z valid sub mapping tables per garbage collection section.

6. The data storage device as claimed in claim 5, wherein:

the upper limit, z, is (Total_G/x)y, where Total_G is a total number of logical address groups.

7. The data storage device as claimed in claim 1, wherein:

after programming a first batch of valid sub mapping tables corresponding to a first garbage collection section to the destination mapping block and prior to downloading a second batch of valid sub mapping tables corresponding to a second garbage collection section to the temporary storage, the controller responds to a request from a host.

8. The data storage device as claimed in claim 7, wherein:

for a target sub mapping table of garbage collection, the controller checks whether a newer version is stored in the temporary storage to avoid programming old sub mapping tables to the destination block.

9. The data storage device as claimed in claim 1, wherein:

the controller establishes a mapping block list to point to the mapping blocks; and from the mapping block list, the controller gets the total number of mapping blocks.

10. The data storage device as claimed in claim 9, wherein:

physical blocks released by the garbage collection are listed in the mapping block list.

11. A control method for a non-volatile memory, comprising:

storing a plurality of sub mapping tables in the non-volatile memory, wherein the sub mapping tables are divided front a logical-to-physical address mapping table according to logical address groups;

setting an upper limit, x, for the total number of mapping blocks allocated in the non-volatile memory to store the plurality of sub mapping tables;

performing garbage collection on a source mapping block in sections, wherein the source mapping block is selected from the mapping blocks; and during each garbage collection section, downloading valid sub mapping tables from the source mapping block to the temporary storage and then programming the valid sub mapping tables from the temporary storage to a destination mapping block which is planned as one of the mapping blocks, wherein the temporary storage is repeatedly used to store valid sub mapping tables downloaded in the different garbage collection sections.

12. The control method as claimed in claim 11, further comprising:

selecting the source mapping block from the mapping blocks when the total number of mapping blocks reaches a critical amount, a; and setting a total section number, y, based on the upper limit, x, and the critical amount, a, to divide the garbage collection of the source mapping block into y sections.

13. The control method as claimed in claim 12, further comprising:

setting the total section number, y, to (x−a)+1.

14. The control method as claimed in claim 12, further comprising:

calculating an amount, M, based on a valid count, VC, and the total section number, y, wherein the amount, M, is calculated to determine the number of valid sub mapping tables to be collected per garbage collection section;

wherein:

the valid count, VC, is the total number of valid sub mapping tables of the source mapping block; and the amount, M, is VC/y.

15. The control method as claimed in claim 14, further comprising:

collecting M valid sub mapping tables per garbage collection section when the amount, M, is not greater than an upper limit, z; and collecting z valid sub mapping tables per garbage collection section when the amount, M, is greater than the upper limit, z.

16. The control method as claimed in claim 15, wherein:

the upper limit, z, is (Total_G/x)/y, where Total_G is the total number of logical address groups.

17. The control method as claimed in claim 11, further comprising:

responding to a request from a host after programming a first batch of valid sub mapping tables corresponding to a first garbage collection section to the destination mapping block and prior to downloading a second batch of valid sub mapping tables corresponding to a second garbage collection section to the temporary storage.

18. The control method as claimed in claim 17, further comprising:

for a target sub mapping table of garbage collection, checking whether a newer version is stored in the temporary storage to avoid programming old sub mapping tables to the destination block.

19. The control method as claimed in claim 11, further comprising:

establishing a mapping block list to point to the mapping blocks, wherein the mapping block list further shows the total number of mapping blocks.

20. The control method as claimed in claim 19, wherein:

physical blocks released by the garbage collection are listed in the mapping block list.

* * * * *